(12) United States Patent
Wang et al.

(10) Patent No.: US 11,149,905 B2
(45) Date of Patent: Oct. 19, 2021

(54) MOBILE NATURAL GAS STORAGE AND TRANSPORTATION UNIT BASED ON ADSORPTION

(71) Applicant: Saudi Arabian Oil Company, Dhahran (SA)

(72) Inventors: Yuguo Wang, Dhahran (SA); Rashid Othman, Dhahran (SA); Georgios Lithoxoos, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 154 days.

(21) Appl. No.: 16/591,907

(22) Filed: Oct. 3, 2019

(65) Prior Publication Data

US 2021/0102666 A1 Apr. 8, 2021

(51) Int. Cl.
*F17C 11/00* (2006.01)
*B01D 53/04* (2006.01)

(52) U.S. Cl.
CPC ............ *F17C 11/007* (2013.01); *B01D 53/04* (2013.01); *B01D 2253/102* (2013.01); *B01D 2253/108* (2013.01); *B01D 2259/4525* (2013.01); *F17C 2221/033* (2013.01)

(58) Field of Classification Search
CPC ............ F17C 11/007; F17C 2221/033; B01D 2253/102; B01D 2253/108; B01D 2259/4525; B01D 53/04
See application file for complete search history.

(56) References Cited

U.S. PATENT DOCUMENTS

| | | | |
|---|---|---|---|
| 3,897,226 A | 7/1975 | Doherty | |
| 4,817,684 A | 4/1989 | Turko et al. | |
| 5,323,752 A | 6/1994 | Von et al. | |
| 5,998,647 A | 12/1999 | Seki et al. | |
| 6,584,780 B2 | 6/2003 | Hibino et al. | |
| 6,613,126 B2 | 9/2003 | Tange et al. | |
| 6,826,911 B2 | 12/2004 | Carver et al. | |
| 7,048,785 B2 | 5/2006 | Wang et al. | |
| 8,225,617 B2 | 7/2012 | Morris et al. | |
| 9,168,485 B2 | 10/2015 | Deckman et al. | |

(Continued)

FOREIGN PATENT DOCUMENTS

CN 105462641 A 4/2016
WO 2011159259 A1 12/2011

OTHER PUBLICATIONS

International Search Report and Written Opinion of PCT Application No. PCT/US2020/053892 dated Jan. 12, 2021: pp. 1-13.

(Continued)

*Primary Examiner* — Sharon Pregler
(74) *Attorney, Agent, or Firm* — Bracewell LLP; Constance G. Rhebergen; Kevin R. Tamm

(57) ABSTRACT

Systems and methods for natural gas storage and transport with a mobile unit, the method including charging a mobile natural gas storage and transport unit with natural gas via adsorption of the natural gas on adsorbent materials disposed within the natural gas storage and transport unit; transporting the natural gas storage and transport unit a distance to proximate a natural gas power generation unit; and discharging the natural gas over time via desorption of the natural gas from the adsorbent materials to power the natural gas power generation unit.

41 Claims, 9 Drawing Sheets

(56) References Cited

U.S. PATENT DOCUMENTS

| | | |
|---|---|---|
| 9,562,649 B2 * | 2/2017 | Wang et al. |
| 9,604,194 B2 | 3/2017 | Wang et al. |
| 9,945,608 B2 | 4/2018 | Ploeger et al. |
| 10,018,027 B2 | 7/2018 | Graney et al. |
| 10,302,254 B2 | 5/2019 | Wang et al. |
| 2005/0005831 A1 | 1/2005 | Krason et al. |
| 2008/0245101 A1 | 10/2008 | Dubettier-Grenier et al. |
| 2013/0283854 A1 | 10/2013 | Wang et al. |
| 2015/0090226 A1 | 4/2015 | Dolan et al. |
| 2015/0211684 A1 | 7/2015 | Santos et al. |
| 2016/0201855 A1 | 7/2016 | Weickert et al. |
| 2020/0292133 A1 * | 9/2020 | Wang et al. |

OTHER PUBLICATIONS

U.S. Appl. No. 62/816,696, "Methods of Making Zeolite-Templated Carbon Pellets and Uses Thereof", filed Mar. 11, 2019.

U.S. Appl. No. 62/816,706, "Systems and Methods of Use of Carbon-Based Pellets in Adsorbed Natural Gas Facility", filed Mar. 11, 2019.

* cited by examiner

MOBILE NATURAL GAS STORAGE AND TRANSPORTATION UNIT BASED ON ADSORPTION

BACKGROUND

Field

The present disclosure relates to mobile natural gas storage and transportation units. In particular, the present disclosure shows mobile natural gas storage units applying adsorption for reduced pressure natural gas transport compared to compressed liquid and cryogenic natural gas transport units.

Description of the Related Art

An important component of natural gas and sales gas is methane. When burned, methane emits carbon dioxide about thirty percent less than oil when it is burned, and natural gas is considered environment-friendly compared to other fossil fuels. This is one reason for the relatively rapid growth in using natural gas for heating and electricity generation over the past few decades. However, transporting natural gas to gas-fired power plants is costlier and more complex than transporting liquids, such as oil, or solids, such as coal, for hydrocarbon-fired power plants. Transporting natural gas to remote destinations is conventionally achieved by turning it into a liquid via cryogenic freezing down to its boiling temperature of −161.5° C., which exhibits a volume that is one six-hundredth of its gaseous volume. This process is expensive since it requires cryogenic refrigeration and further pretreatment prior to shipment. Cryogenic freezing and liquid transport also require regasification at the destination end for the liquid natural gas (LNG).

Another option for transporting natural gas short-to-medium distances is by compressing it in a pipeline. This is referred to as compressed natural gas (CNG). At a pressure of about 50 bars, the volume-to-volume storage capacity is about 50, which is $1/12$ of what is achieved with LNG. When using CNG technologies to provide feed for vehicles engines, the compression pressure is about 250 bars in order to increase energy density and the volume-to-volume storage ratio.

The transportation capacity of a pipe or vessel can be increased by filling it with an adsorbent that has high adsorptive storage capacity for methane, and this technology is called adsorbed natural gas storage (ANG). Certain processes include introducing natural gas into the natural gas storage facility, separating the natural gas into a heavy natural gas component and a light natural gas component, and retaining the components in the storage facility. The process also includes releasing the heavy and light natural gas components and mixing them into a released natural gas product for power plants.

CNG for transporting natural gas requires increased pressures. CNG requires greater pressures up to about 250 bars, and this increases the cost of compression and wall thickness for large vessels which prevents inexpensive manufacturing. With respect to LNG, it is the most practically used method for large scale exporting through ships. LNG, however, requires a regasification infrastructure, which makes it impractical for independent power generators, domestic users, and natural gas filling stations to receive LNG.

SUMMARY

Applicant has recognized a need for systems and methods for adsorption based natural gas storage and transport at reduced pressures compared to liquefied natural gas (LNG) or compressed natural gas (CNG) storage and transport. Microporous carbon adsorbents in the presently disclosed systems and methods allow for small-scale, transportable, skid-mounted natural gas adsorptive storage units and facilities that can be loaded on trucks, or other common transportation units, for gas transportation. ANG can store more gas at the same medium range pressure of CNG, or store a similar amount of gas as CNG, but at lower pressure. Economically, the cost for LNG is about 1.0 USD/one million British Thermal Units (MMBTU) and that of CNG is about 1.63 USD/MMBTU, while ANG cost is only about 0.75 USD/MMBTU.

Certain embodiments here disclose a mobile natural gas transportation facility based on adsorption that is skid-mounted on a truck, or similar transportation vehicle such as a train or ship. Systems and methods can be used to deliver the stored volume of natural gas to delivery locations where natural gas power generators are used. This allows for replacement of existing mobile diesel generators where gas supply by pipeline is not accessible. Suitable adsorbent materials are shown in the Examples as follows, and adsorbent materials such as hydrophobic zeolites with all silica or a greater silica to aluminum ratio can be applied in the ANG storage systems and methods described here.

One of the present advantages is reducing reliance on liquid hydrocarbons, such as oil or diesel, as a feedstock for power generation by applying systems for transporting sales gas from a natural gas station facility to a natural gas power generator, and the natural gas can replace a diesel or liquid hydrocarbon power generator. The use of natural gas for power generation is less costly and value-adding due to the lower cost of local production of natural gas and the fact that any spared diesel and liquid hydrocarbon can be exported or used as feedstock to make petrochemicals or refinery products. Another benefit is that using natural gas for power generation can reduce carbon dioxide emissions because natural gas has a higher hydrogen to carbon ratio than that of diesel or liquid hydrocarbon fuels.

Units and facilities of the present disclosure can include one or more guard beds, adsorber vessels, compressors and gas coolers. Systems can include an array of guard beds and adsorber vessels for storing and transporting larger quantities of natural gas. Activated carbon adsorbents with micropores and mesopores are suitable for use in a guard bed and are advantageously suited for the adsorption of $C_2+$ hydrocarbons, without condensing and blocking the pores after desorption. Adsorber vessels can use adsorbents such as activated carbons, and in some embodiments the activated carbon slit pore diameter should be from about 11.2 Å to about 11.4 Å. For example, a majority of a suitable porous material in the adsorber units can exhibit this pore diameter range. Other adsorbent materials for use with or alternative to activated carbon include zeolite-templated carbon materials, hydrophobic zeolites, metal organic frameworks, carbon molecular sieves, carbon fibers, carbon nanotubes, and combinations thereof, which are all suitable for methane adsorptive storage.

Adsorbent materials to be applied should be mechanically robust and stable under cyclic operation conditions. Suitable adsorbents also have increased bulk density, increased micropore volume, and greater than about 130 volume-to-volume methane adsorptive storage capacity at a pressure of about 50 bars or higher. Adsorbent materials should also be hydrophobic toward moisture contamination in natural gas.

Therefore, disclosed here is a method for natural gas storage and transport with a mobile unit, the method including charging a mobile natural gas storage and transport unit with natural gas via adsorption of the natural gas on adsorbent materials disposed within the mobile natural gas storage and transport unit; transporting the mobile natural gas storage and transport unit a distance to proximate a natural gas power generation unit; and discharging the natural gas over time via desorption of the natural gas from the adsorbent materials to power the natural gas power generation unit. In some embodiments, the step of charging lasts for between about 1 hour and about 5 hours. In other embodiments, the step of charging lasts for about 3 hours. Still in other embodiments, the adsorbent materials comprise microporous adsorbent materials. In yet other embodiments, the microporous adsorbent materials comprise at least one of activated carbon or silica zeolites. In still other embodiments, the step of transporting does not consume natural gas adsorbed to the adsorbent materials.

In other embodiments of the method, the step of transporting includes at least one mode of transportation selected from the group consisting of: a truck, a train, a ship, and a plane. Still in other embodiments, the step of discharging lasts for between about 5 hours and about 10 hours. In still other embodiments, the step of discharging lasts for about 6 hours. In certain embodiments, the step of charging includes separating components of the natural gas by adsorption of components with a greater molecular weight than methane in a guard bed separate from the adsorbent materials. Still in other embodiments, the step of charging includes the step of cooling a portion of the natural gas storage and transport unit. In yet other embodiments, the step of discharging includes the step of compressing at least a portion of discharged natural gas. Still in other embodiments, the portion of natural gas is compressed to between about 300 pounds per square inch absolute (psia) and about 500 psia. In other embodiments, the step of discharging includes the step of cooling at least a portion of discharged natural gas.

In certain embodiments of the method, the step of charging occurs with the adsorbent materials at between about 10° C. to about 30° C. In other embodiments, a majority of the adsorbent materials have pore diameters of between about 10 Å to about 50 Å. Still in other embodiments, the step of charging includes charging at least one guard bed with microporous materials having pore sizes between about 25 Å and about 50 Å, and charging at least one adsorbent bed with the adsorbent materials, where a majority of the adsorbent materials have pore diameters of between about 10 Å to about 20 Å. In yet other embodiments, the step of discharging the natural gas over time occurs at least in part due to pressure built up in the mobile natural gas storage and transport unit from the step of charging. Still in other embodiments, the step of charging charges between about 0.1 to about 0.5 million standard cubic feet (MMSCF) of natural gas to the adsorbent materials.

In certain other embodiments, at least about 90% of the natural gas charged during the step of charging is discharged during the discharging step and used to generate power in the natural gas power generation unit. Still in other embodiments, the step of discharging occurs during and throughout a period of peak demand for electricity. In yet other embodiments, the step of charging results in adsorbed natural gas at about 1 atm pressure and about 100° F. temperature.

Additionally disclosed is a system for natural gas storage and transport with a mobile unit, the system including a guard bed, the guard bed comprising guard bed adsorbent materials operable to adsorb natural gas components with a molecular weight greater than methane, the guard bed operable to fluidly connect to a natural gas charging station to charge the system with natural gas; an adsorber bed, the adsorber bed comprising adsorber bed adsorbent materials operable to adsorb methane from natural gas, where the adsorber bed is fluidly coupled to the guard bed; and a mobile platform operable to hold the guard bed and adsorber bed during transport from the natural gas charging station to a discharging station, where the system is operable to discharge the natural gas over time at the discharging station via desorption of the natural gas from the adsorbent materials.

In some embodiments of the system, the system includes two adsorber beds and the system charges with natural gas from a natural gas sales pipeline in between about 1 hour and about 5 hours. In other embodiments, the system charges with natural gas from a natural gas sales pipeline in about 3 hours. Still in other embodiments, the adsorbent materials comprise microporous adsorbent materials. In certain embodiments, the microporous adsorbent materials comprise at least one of activated carbon or silica zeolites. Still in other embodiments, the system does not consume natural gas adsorbed to the adsorbent materials during transport for fuel for the system. In certain embodiments, the mobile platform is suitable for transport with at least one mode of transportation selected from the group consisting of: a truck, a train, a ship, and a plane. Still in other embodiments, the system discharging at the discharging station lasts for between about 5 hours and about 10 hours.

In certain embodiments, the system discharging at the discharging station lasts for about 6 hours. Still in other embodiments, the system further comprises a cooling unit to cool the natural gas. In still other embodiments, the system further comprises a compressor, where the compressor is operable to compress a portion of natural gas to between about 300 pounds per square inch absolute (psia) and about 500 psia proximate the discharging station. In yet other embodiments, the system is charged with natural gas at between about 10° C. to about 30° C. Still in other embodiments, a majority of the adsorbent materials have pore diameters of between about 10 Å to about 50 ÅA. In certain embodiments, the guard bed adsorbent materials comprise microporous materials having pore sizes between about 25 Å and about 50 Å, and the adsorber bed adsorbent materials comprise adsorbent materials where a majority of the adsorbent materials have pore diameters of between about 10 Å to about 20 Å.

Still in other embodiments, the system is operable to discharge the natural gas over time at least in part due to pressure built up in the system from charging. In certain embodiments, the system is operable to hold for transport between about 0.1 to about 0.5 million standard cubic feet (MMSCF) of natural gas in the adsorbent materials. Still in other embodiments, at least about 90% of the natural gas charged to the system is discharged from desorption to the discharging station. In certain embodiments, the system when charged results in adsorbed natural gas at about 1 atm pressure and about 100° F. temperature. Certain systems and methods here have microporous adsorbent materials comprising activated carbon and silica zeolites, the silica zeolites positioned to protect the activated carbon from dislodgment and moisture in natural gas.

BRIEF DESCRIPTION OF THE DRAWINGS

These and other features, aspects, and advantages of the present disclosure will become better understood with regard to the following descriptions, claims, and accompanying drawings. It is to be noted, however, that the drawings

DETAILED DESCRIPTION

So that the manner in which the features and advantages of the embodiments of systems and methods for adsorption based natural gas storage and transport at reduced pressures compared to compressed liquid natural gas transport and cryogenic transport, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
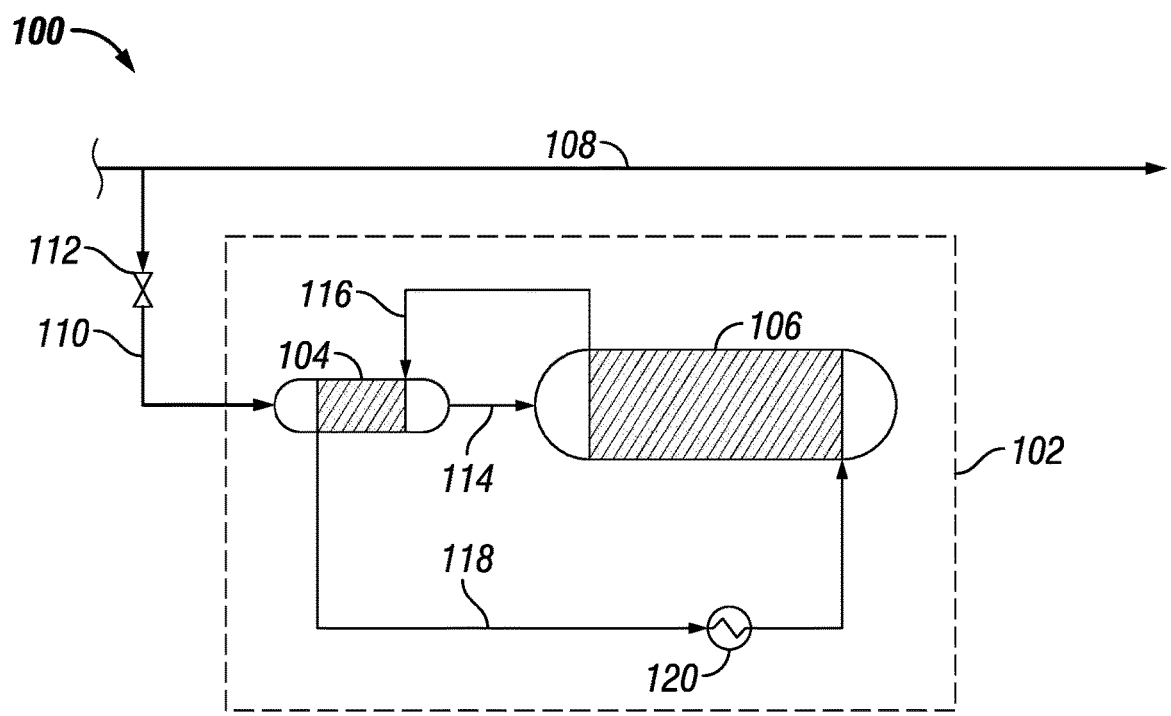
FIG. 1 is a process flow diagram for charging a reduced pressure natural gas adsorption storage and transport unit with one guard bed and one adsorber.

Referring first to FIG. 1, a process flow diagram is shown for charging a reduced pressure natural gas adsorption storage and transport unit with one guard bed and one adsorber. In charging system 100, mobile unit 102 includes a guard bed 104 and an adsorber 106. Mobile unit 102 can be disposed atop the back of a truck such as a tractor-trailer, or may be disposed atop a train car or boat. Mobile unit 102 is movable by a variety of land-based and sea-based vehicles. Guard bed 104 is fluidly coupled to a natural gas pipeline 108 via line 110 and connection valve 112. When connection valve 112 is open, pressure in natural gas pipeline 108, such as a sales gas pipeline, can charge guard bed 104 and adsorber 106 via pressure of the natural gas pipeline, which can be up to about 900 psig.

Guard bed 104 and adsorber 106 are fluidly coupled by lines 114, 116, and 118. A gas cooler 120 is shown disposed on line 118 between guard bed 104 and adsorber 106. Gas cooler 120 expedites the charging process by maintaining a cool temperature for both guard bed 104 and adsorber 106, for example at between about 10° C. to about 30° C. In some embodiments, suitable pressure ranges for both the guard bed 104 and adsorber 106 are between about 35 to about 60 bars and the storage temperature can be between about −40° C. to about 45° C. In some embodiments, both the guard bed 104 and the adsorber 106 work at about the same temperatures and pressures. During and after charging, the natural gas can be recycled if necessary a suitable number of times between guard bed 104 and adsorber bed 106 to adsorb larger $C_{2+}$ molecules and damaging impurities in guard bed 104 and to adsorb substantially pure, for example greater than 90 mol. %, 95 mol. %, or 99 mol. %, methane in the adsorber 106.

Guard bed 104 adsorbs larger molecules such as propane, butane, pentane, hexane, and other impurities such as mercaptans, hydrogen sulfide ($H_2S$), and carbonyl sulfide (COS), rather than smaller molecules such as methane, $CH_4$. Larger molecules and impurities in natural gas from natural gas pipeline 108 can poison or damage adsorber 106, which contains adsorbent material. Adsorbent materials with greater pore diameters are required to remove large molecules and impurities in order to protect adsorber 106. In some embodiments, the pore size of porous materials in guard bed 104 or a majority of porous materials in guard bed 104 are larger than about 25 Å and smaller than about 50 Å. Adsorbent bed material for adsorbing primarily methane in adsorber 106 is in some embodiments material with pore diameters of between about 10 Å to about 20 Å. Slit pore materials of carbon are preferred in some embodiments. The slit pores for activated carbon in some embodiments can have a pore width of about 11.2 Å to about 11.4 Å, which is optimized for adsorptive methane storage. For example, a majority of the adsorbent material can exhibit a pore width of about 11.2 Å to about 11.4 Å in adsorber 106.

In some embodiments, pore diameter for carbon materials in adsorber 106, in addition to or alternative to other porous materials, is between about 11.2 Å to about 11.4 Å. Other mixed materials may exhibit other pore sizes. A sample sales gas composition for use in embodiments of the present disclosure is shown in Table 1.

TABLE 1

Example sales gas composition as related to
natural gas pipeline 108.

| Component | Mole, % |
|---|---|
| Nitrogen | 6.23 |
| Carbon Dioxide | 1.71 |
| Hydrogen Sulfide | 0.00 |
| Methane | 80.86 |
| Ethane | 6.98 |
| Propane | 2.61 |
| iso-Butane | 0.43 |
| n-Butane | 0.74 |
| iso-Pentane | 0.18 |
| n-Pentane | 0.15 |
| n-Hexane | 0.06 |
| n-Heptane | 0.05 |
| Total | 100.00 |

Figure 2:
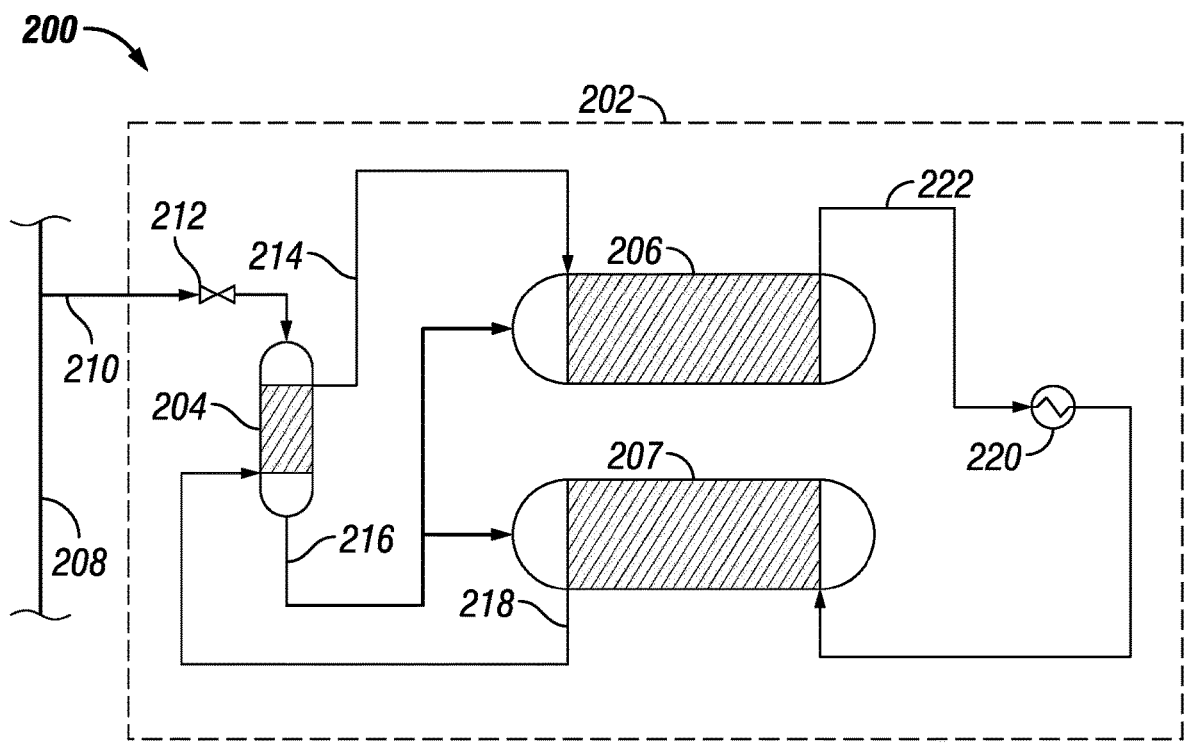
FIG. 2 is a process flow diagram for charging a reduced pressure natural gas adsorption storage and transport unit with one guard bed and two adsorbers.

Referring now to FIG. 2, a process flow diagram is shown for charging a reduced pressure natural gas adsorption storage and transport unit with one guard bed and two adsorbers. In charging system 200, mobile unit 202 includes a guard bed 204 and two adsorbers 206, 207. Mobile unit 202 can be disposed atop the back of a truck such as a tractor-trailer, or may be disposed atop a train car or boat. Mobile unit 202 is movable by a variety of land-based and sea-based vehicles. Guard bed 204 is fluidly coupled to a natural gas pipeline 208 via line 210 and connection valve 212. When connection valve 212 is open, pressure in natural gas pipeline 208, such as a sales gas pipeline, can charge guard bed 204 and adsorbers 206, 207 via pressure of the natural gas pipeline, which can be up to about 900 psig. Guard bed 204 and adsorbers 206, 207 are fluidly coupled by lines 214, 216, and 218. Recycle can be applied amongst the units if necessary to ensure separation of gaseous components, for example those shown in Table 1. A gas cooler 220 is shown disposed on line 222 between adsorbers 206, 207. Gas cooler 220 expedites the charging process by maintaining a cool temperature for guard bed 204 and adsorbers 206, 207, for example at between about 10° C. to about 30° C.

Combustion engines using natural gas from adsorbent natural gas storage systems require different gas release kinetics than those of the present disclosure, because operation of combustion engines requires fast release and goes through acceleration and deceleration cycles in seconds or minutes. In certain engine systems, therefore, $C_3/C_4$ hydrocarbons are adsorbed on activated carbons with small pores and $C_1/C_2$ hydrocarbons are adsorbed on larger pore activated carbons. Oppositely here, larger pore size adsorbents are used for the guard bed, and smaller pore size adsorbents are used for the main methane adsorbent bed. In embodiments of the present disclosure, when natural gas is released, it will be released from both the guard bed(s) and main bed(s) simultaneously and the mixed gas will have the same composition as the original incoming sales gas composition. Thus, sales gas is released and supplied to a new location or tank as fuel to power generators. In the present disclosure, embodiments of the storage facility for storing and transporting gas to different locations allows for the charging and releasing gas on the scale of hours or minutes.

Figure 3:
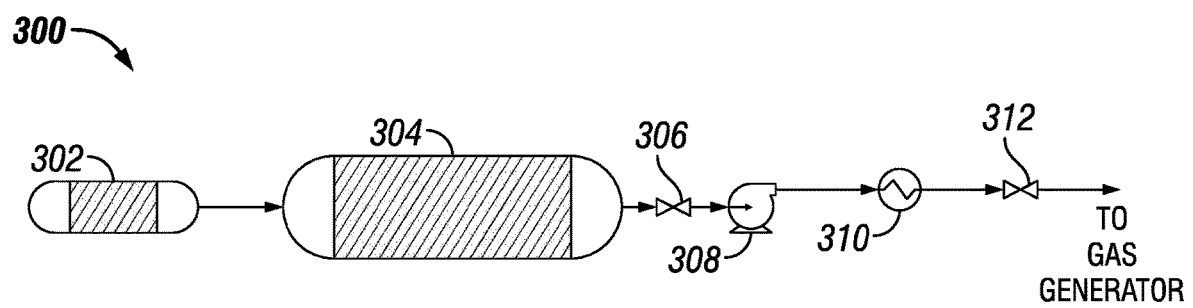
FIG. 3 is a process flow diagram for discharging a reduced pressure natural gas adsorption storage and transport unit with one guard bed and one adsorber.

FIG. 3 is a process flow diagram for discharging a reduced pressure natural gas adsorption storage and transport unit with one guard bed and one adsorber. In system 300, guard bed 302 with adsorbents charged with carbon components heavier than methane, for example ethane and propane, and optionally other impurities such as $CO_2$, is discharged through main methane adsorber 304, in which adsorbent material is charged with mostly methane, for example 95 mol. % methane or 99 mol. % methane. Larger pore size adsorbents are used for the guard bed 302, and smaller pore size adsorbents are used for the main methane adsorber 304. Mixed gas from the guard bed 302 and main methane adsorber 304 is discharged through a release control valve 306 to a compressor 308, a gas cooler 310, and ultimately passes through valve 312 to a gas generator (not pictured). In some embodiments, the resulting pressure after compression provided by compressor 308 should substantially match the pressure used in a natural gas generator being supplied or the storage tank(s) used for a natural gas generator being supplied, and the resulting temperature, controlled with gas cooler 310, should substantially match ambient temperatures at which a natural gas generator is operating or the temperature at which the natural gas storage tank(s) for a generator is kept.

Figure 4:
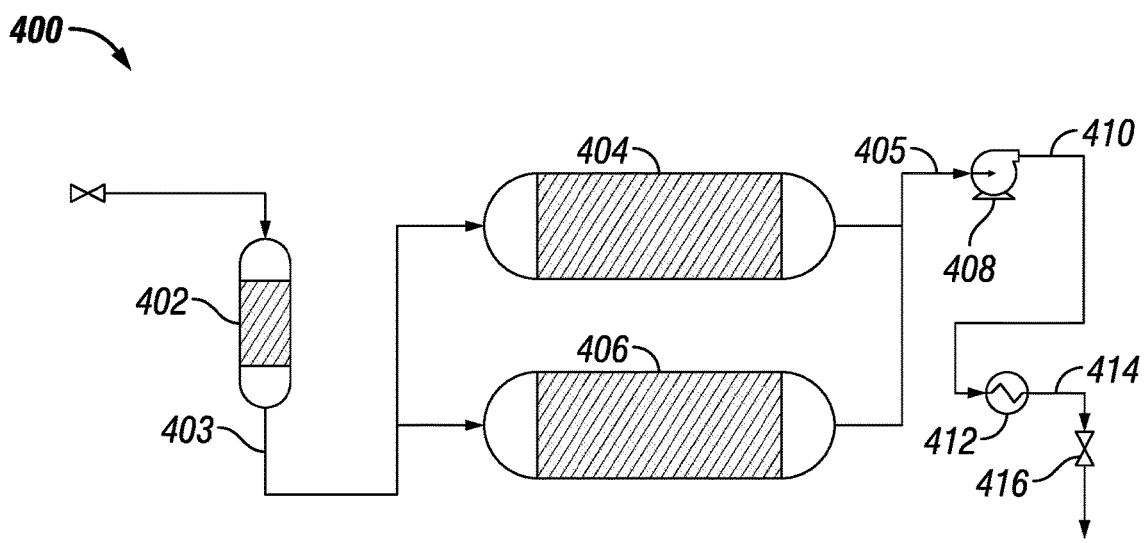
FIG. 4 is a process flow diagram for discharging a reduced pressure natural gas adsorption storage and transport unit with one guard bed and two adsorbers.

FIG. 4 is a process flow diagram for discharging a reduced pressure natural gas adsorption storage and transport unit with one guard bed and two adsorbers. In system 400, guard bed 402 discharges via line 403 through either or both of first adsorber 404 and second adsorber 406, and methane from first adsorber 404 and second adsorber 406, along with heavier hydrocarbon components in addition to or alternative to impurities from guard bed 402 flow via line 405 to gas compressor 408, then through line 410 to gas cooler 412, and ultimately out line 414 through release control valve 416 to a gas generator (not pictured). Larger pore size adsorbents are used for the guard bed 402, and smaller pore size adsorbents are used for methane adsorbers 404, 406. Mixed gas from the guard bed 402 and methane adsorbers 404, 406 is discharged through gas compressor 408, a gas cooler 412, and ultimately passes through release control valve 416 to a gas generator (not pictured).

In FIGS. 3 and 4, compressors 308, 408 are optional, and in some embodiments the internal pressure of systems 300 or 400 is used as the driving force during discharge to a gas generator. When the discharge pressure of system 300 or 400 is lower than the customer operation pressure of a gas-powered generator, gas is compressed by compressors 308, 408 to the operation pressure of the gas-powered generator in order to further release the gas stored.

Figure 5:
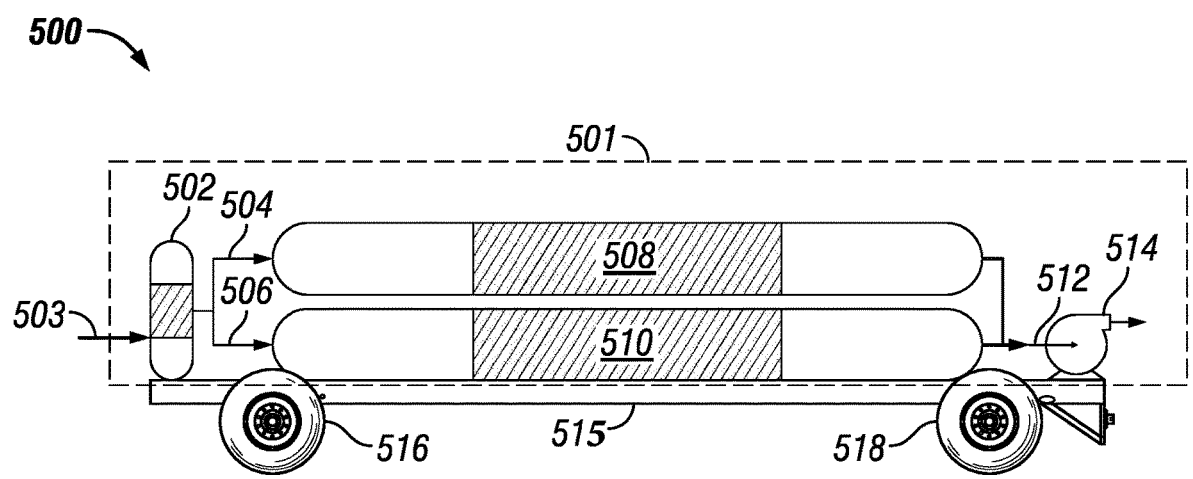
FIG. 5 provides a side view diagram for a reduced pressure natural gas adsorption storage and transport unit with one guard bed and two adsorbers.

FIG. 5 provides a side view diagram for a reduced pressure natural gas adsorption storage and transport unit with one guard bed and two adsorbers. In system 500, movable natural gas storage and transport unit 501 is removably and quickly interchangeably mounted atop a skid 515 with a front wheel 516 and back wheel 518. As noted, trains, trucks, boats, and other modes of transportation are envisioned for movable natural gas storage and transport unit 501. Movable natural gas storage and transport unit 501 includes a guard bed 502 fluidly coupled via line 504 to adsorber 508 and fluidly coupled via line 506 to adsorber 510. Guard bed 502 and adsorbers 508, 510 can be charged from a natural gas sales line at inlet 503, and guard bed 502 and adsorbers 508, 510 can be discharged via line 512 and optional compressor 514 to a gas generator at a remote distance away from a natural gas sales pipeline. Larger pore size adsorbents are used for the guard bed 502, and smaller pore size adsorbents are used for methane in adsorbers 508, 510. Mixed gas from the guard bed 502 and adsorbers 508, 510 is discharged through compressor 514. A gas cooler (not pictured) is optional and can be a part of movable natural gas storage and transport unit 501.

In FIG. 5, compressor 514 is optional, and in some embodiments the internal pressure of system 500 is used as the driving force during discharge to a gas generator. When the discharge pressure of system 500 is lower than the customer operation pressure of a gas-powered generator, gas is compressed by compressor 514 to the operation pressure in order to further release the gas stored.

Figure 6:
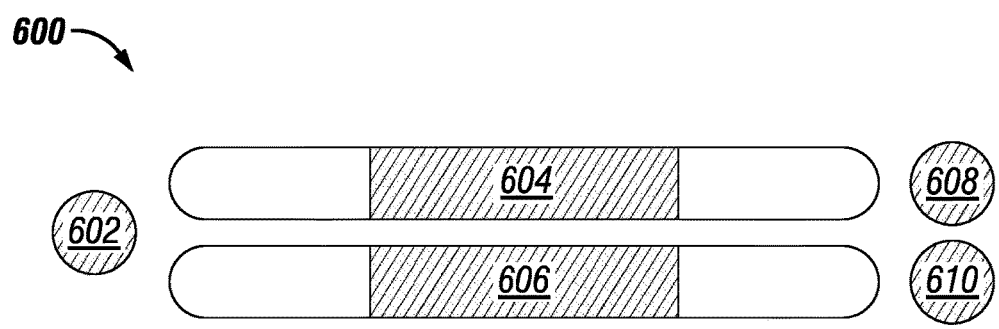
FIG. 6 provides a top view diagram for a reduced pressure natural gas adsorption storage and transport unit with one guard bed and two adsorbers.

FIG. 6 provides a top view diagram for a reduced pressure natural gas adsorption storage and transport unit with one guard bed and two adsorbers. In system 600, a top view is shown of guard bed 602, adsorbers 604, 606, an optional gas cooler 608 and an optional gas compressor 610. As shown in FIG. 5, the system of FIG. 6 is meant to fit on a skid removably and interchangeably, and can be moved between a truck, train, boat, or other transportation unit.

Still referring to FIGS. 1-6, in some embodiments guard beds and adsorber vessels are generally cylindrical vessels such as tanks with a domed cap on each end. Example physical dimensions are listed in the Table 2.

TABLE 2

Example physical dimensions for a mobile natural gas storage and transportation unit with a guard bed and one or more adsorbers.

| Unit | Diameter (inch) | Length (m) | Volume (m$^3$) |
|---|---|---|---|
| Guard Bed | 40 | 2 | 3.18 |
| Main Adsorber | 56 | 12 | 19.07 |

Reduced pressure mobile natural gas storage and transportation units can have multiple guard beds and adsorber vessels. Additionally, a mobile unit can have multiple layers of adsorber vessels, with each layer having two adsorber vessels as shown in FIGS. 5 and 6, for example a mobile unit with 2×2 methane adsorption units. Guard bed dimensions can vary of course, with diameters between about 40 inches to about 56 inches, lengths between about 1 meter and about 2 meters, and volumes between about 0.82 m$^3$ to about 3.18 m$^3$. Adsorber dimensions can also vary of course, with diameters between about 40 inches and about 56 inches, lengths between about 10 and about 15 meters, and volumes between about 15.9 m$^3$ and about 23.8 m$^3$.

In some embodiments, activated carbons are used in the guard bed with micropores and mesopores that are suitable for the adsorption of C$_2$+ hydrocarbons without condensing and blocking the pores after desorption. Table 3 shows surface area, pore volume, and pore size for an activated carbon that is suitable for use as guard bed adsorbent with mesoporous pores (here greater than about 20 Å and less than about 50 Å), where the average adsorption pore size is about 21.95 Å. Table 3 shows example surface area, pore volume, and pore size for guard bed activated carbon.

TABLE 3

Surface area, pore volume, and pore size for guard bed activated carbon.

| Surface Area | |
|---|---|
| Brunauer-Emmett-Teller (BET) Surface Area: | 2024.55 m$^2$/g |
| Total Pore Volume | 1.11 cm$^3$/g |
| Micropore Volume | 0.19 cm$^3$/g |
| Adsorption Average Pore Width | 21.94 Å |

In other suitable adsorbents, BET surface area can vary between about 1,000 m$^2$/g to about 2,024.55 m$^2$/g, or between about 800 m$^2$/g to about 3,000 m$^2$/g. Total pore volume can vary between about 1 cm$^3$/g and about 2 cm$^3$/g, micropore volume can vary between about 0.10 cm$^3$/g and about 1.2 cm$^3$/g, and adsorption average pore width can vary between about 15 Å and about 30 Å, or between about 20 Å to about 25 Å.

Figure 7A:
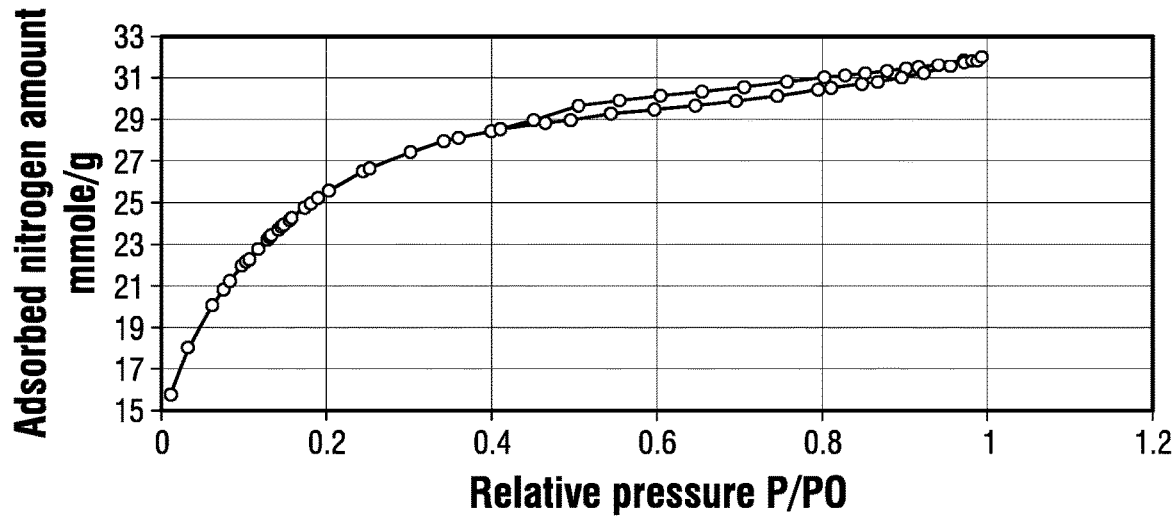
FIG. 7A is a graph showing activated carbon nitrogen adsorption and desorption isotherms at 77 K for an example guard bed.
Figure 7B:
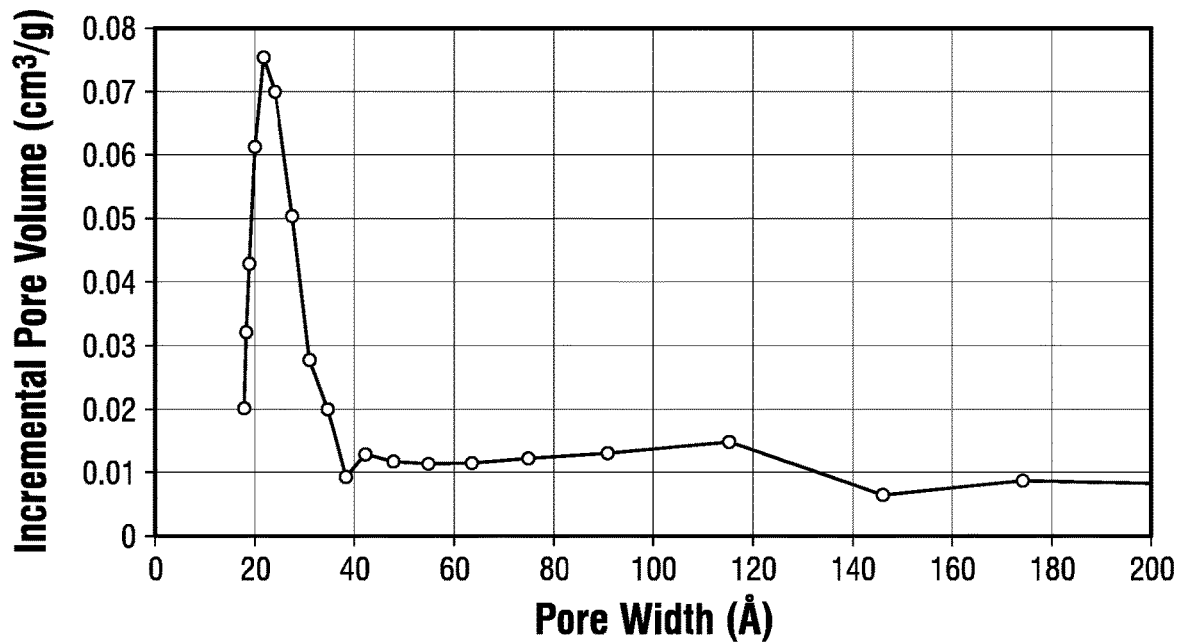
FIG. 7B is a graph showing activated carbon pore size distribution for an example guard bed.

FIG. 7A is a graph showing activated carbon nitrogen adsorption and desorption isotherms at 77 K for an example guard bed. FIG. 7B is a graph showing activated carbon pore size distribution for an example guard bed. FIG. 7B shows a bimodal pore size distribution with most of the pores having a pore width (diameter) of about 22 Å, which is in the mesopore range, and the other pore diameter cluster is around 120 Å, in the macropore range.

Figure 8:
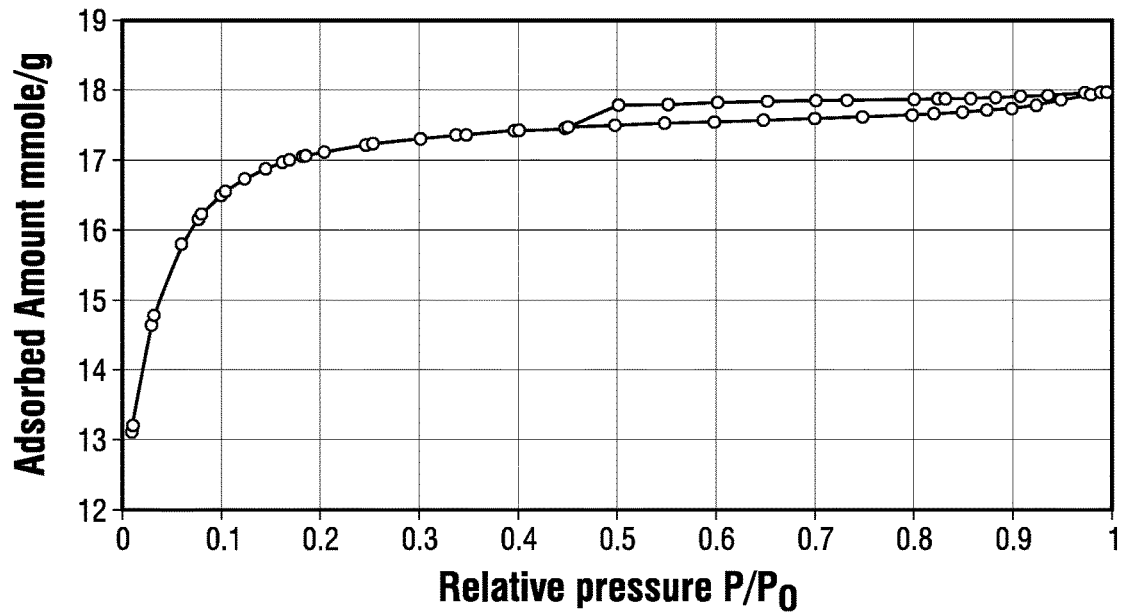
FIG. 8 is a graph showing a nitrogen adsorption isotherm at 77 K on activated carbon.
Figure 9:
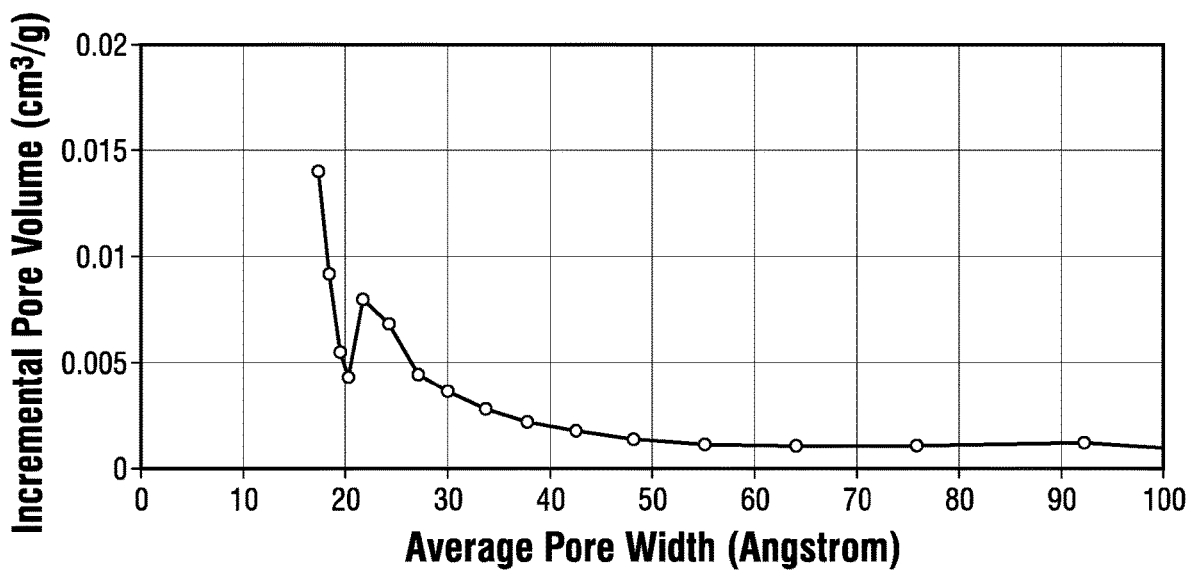
FIG. 9 is a graph showing pore size distribution of an activated carbon adsorbent.

Activated carbon SRD08017 was tested for methane adsorptive storage, for example in adsorber vessels of the present disclosure for transportation. FIG. 8 is a graph showing a nitrogen adsorption isotherm at 77 K on the activated carbon. FIG. 9 is a graph showing pore size distribution of the activated carbon adsorbent for an adsorber bed.

Activated carbon SRD08017 physical properties are listed in Table 4. The tested activated carbon has large percent of micropore volume (0.56/0.599=93.5%), and its average pore width is in the micropore range, close to the optimized pore width for methane adsorptive storage, therefore, it is a suitable activated carbon for methane in ANG adsorber vessels.

TABLE 4

Physical Properties of the Granular Activated Carbon Sample Tested SRD08017.

| | |
|---|---|
| BET Surface Area: | 1426 m$^2$/g |
| Total Pore Volume | 0.599 cm$^3$/g |
| Micropore Volume | 0.560 cm$^3$/g |
| Adsorption Average Pore Width | 17.47 Å |
| ASTM Mesh Size | 2 × 60 |
| Bulk Density (g/cm$^3$) | 0.49 |
| Skeletal density (g/cm$^3$) | 2.402 |

In other suitable embodiments of adsorbent material, bulk density can vary between about 0.35 g/cm$^3$ and about 0.50 g/cm$^3$, and skeletal density can vary between about 2.1 g/cm$^3$ to about 2.5 g/cm$^3$.

Figure 10:
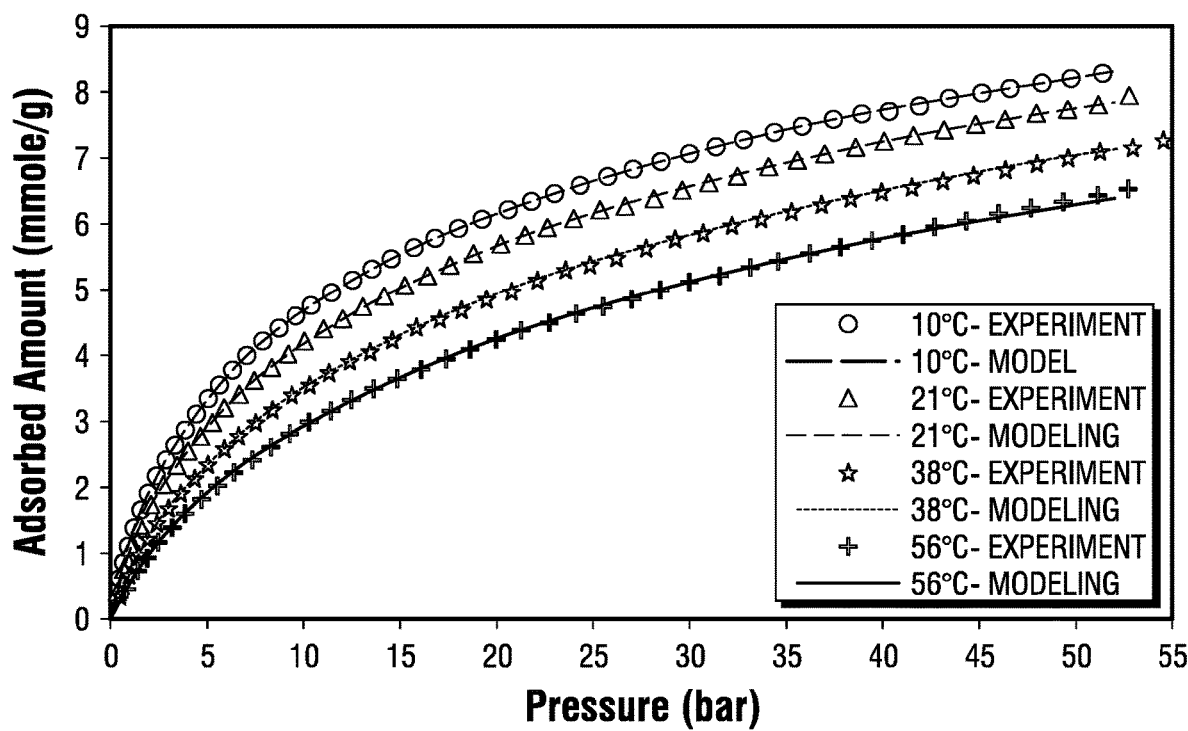
FIG. 10 is a graph showing modelling and experimental data for an example adsorbent at different temperatures.

FIG. 10 is a graph showing modelling and experimental data for an example adsorbent at different temperatures. Specifically, FIG. 10 shows the experimental data and modelling of methane adsorption on activated carbon SRD08017. The methane adsorption isotherms were collected at four different temperatures of 10° C., 21° C., 38° C., and 56° C. The Toth empirical isotherm model was used and the nonlinear least square method was used to optimize the parameters for the temperature dependent Toth isotherm model for activated carbon SRD08017.

The parameters for this Toth model for activated carbon SRD08017 regarding methane adsorption are shown in Table 5. The average relative error is defined in Equation 1.

$$\text{Average relative error}(ARE)\% = \frac{\sum \left| \frac{Y_i^{exp} - Y_i^{modeled}}{Y_i^{exp}} \right|}{N} \quad \text{Eq. 1}$$

In Equation 1, N is the number of experimental data points, superscripts exp and modeled stand for the experimental and modeled values respectively, and Y represents the amount of methane adsorbed. Table 5 shows Toth isothermal model parameters for activated carbon SRD08017.

TABLE 5

Toth isothermal model parameters for activated carbon SRD08017.

| Equation Name | Equation Expression | Optimized Parameters using 294.15K as reference temperature | ARE (%) |
|---|---|---|---|
| Toth | $C_\mu = C_{\mu s,0} \dfrac{bP}{[1+(bp)^t]^{1/t}}$ | $C_{\mu s,0}$ = 17.934 mmole | 1.3047 |
| | $b = b_0 \exp\left[\dfrac{Q}{RT_0}\left(\dfrac{T_0}{T} - 1\right)\right]$ | $\chi = 0$ $b_0$ = 0.12929 bar$^{-1}$ | |
| | $t = t_0 + \alpha\left(1 - \dfrac{T_0}{T}\right)$ | Q = 20.259 kJ/mole | |
| | $C_{\mu s} = C_{\mu s,0}\exp\left[\chi\left(1 - \dfrac{T}{T_0}\right)\right]$ | $t_0$ = 0.42718 $\alpha$ = 0.2573 | |

Figure 11:
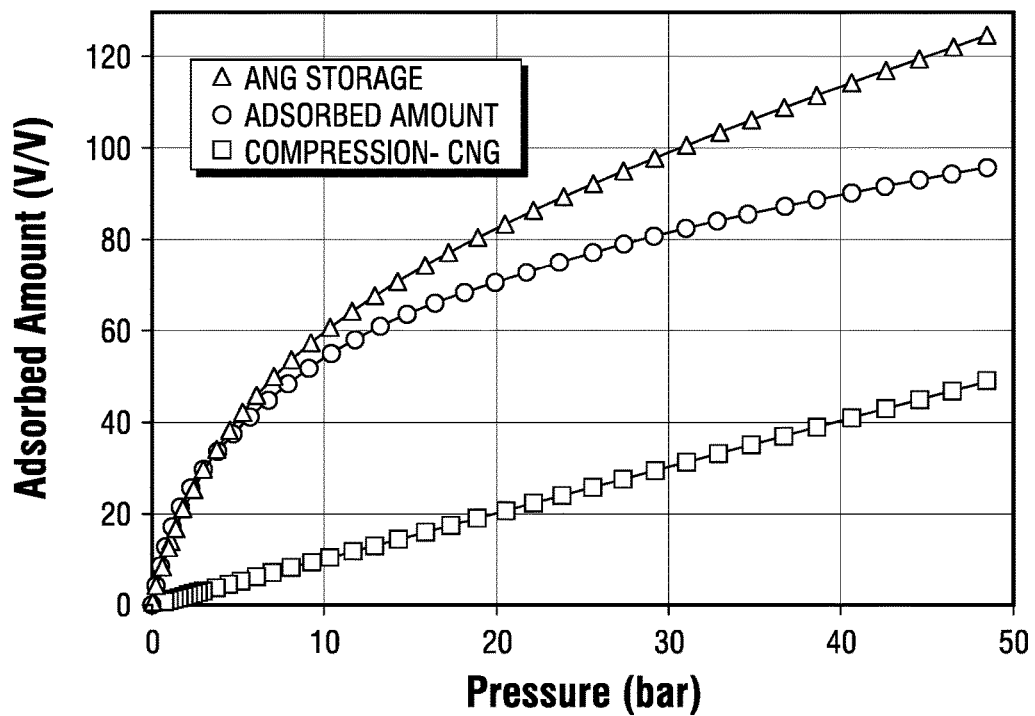
FIG. 11 is a graph showing a comparison of the amount of total ANG storage, adsorbed amount storage, and CNG storage at 10° C. and up to 50 bars.

The stored amount of methane inside a vessel includes the amount of methane adsorbed on the surface of the adsorbent and compressed methane gas in the mesopores and macropores of activated carbon, and in any voids of the bed. FIG. 11 shows a comparison of stored amount (ANG amount), adsorbed amount, and the stored amount by CNG. ANG can store about 2.5 times of that of CNG at 10° C. and 50 bars.

Adsorption heat modelling was carried out to determine required cooling duty for the storage and transportation facility in certain embodiments. Adsorption equilibrium and isosteric heat of adsorption can be applied to determine proper design and operation of gas-phase adsorption processes. The isosteric heat of adsorption is usually estimated from temperature dependence of an adsorption isotherm.

Using the Clausius-Clapeyron equation shown by Equation 2 and the Toth isothermal model, isosteric heat of adsorption is derived and represented in Equation 3.

$$-\Delta H = RT^2(\partial \ln P/\partial T)_\theta \quad \text{Eq. 2}$$

$$-\Delta H = Q - \frac{1}{t}(\alpha RT_0)\left\{\ln(bP) - [1+(bP)^t]\ln\left[\frac{bP}{(1+(bP)^t)^{1/t}}\right]\right\} = \quad \text{Eq. 3}$$

$$Q - \frac{1}{t}(\alpha RT_0)\left\{\ln\left[\frac{\theta}{(1-\theta)^{1/t}}\right] - \frac{\ln\theta}{(1-\theta^t)}\right\} =$$

$$Q - \frac{1}{t}(\alpha RT_0)\left\{\ln\left[\frac{C_\mu}{(C_{\mu s}{}^t - C_\mu{}^t)^{1/t}}\right] - \frac{\ln(C_\mu/C_{\mu s})}{(1-(C_\mu/C_{\mu s})^t)}\right\}$$

Figure 12:
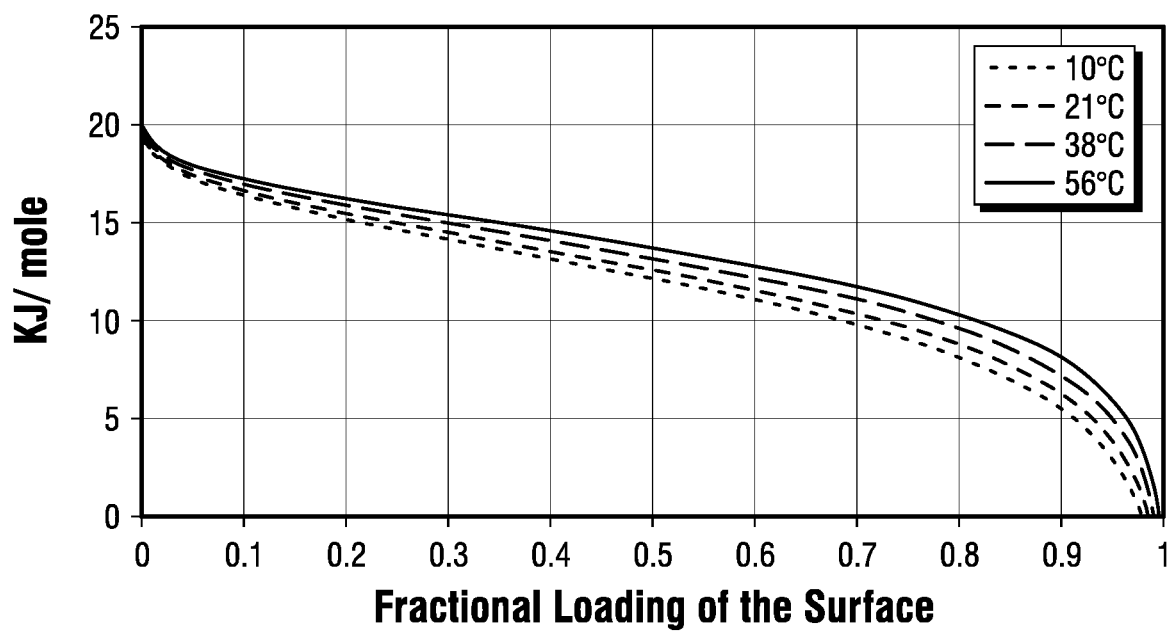
FIG. 12 is a graph showing the calculated isothermic heat of adsorption for an activated carbon sample versus loading using the Toth equation at four different temperatures.

Isosteric heat of adsorption represented by Equation 3 is a function of loading of methane or pressure. In Equation 3, Q represents the isosteric heat when fractional loading is zero. FIG. 12 shows the variation of the isosteric heat of adsorption for activated carbon SRD08017 at four different temperatures. The value of isosteric heat of adsorption determined by Equation (3) for activated carbon SRD08017 is close to reported values of 20 KJ/mole. The decrease of the isosteric heat with loading means that methane molecules prefer to adsorb onto sites of high energy. Then, as adsorption progresses methane molecules adsorb onto sites of low energy, which results in a slow decrease in isosteric heat of adsorption versus fractional loading.

Figure 13:
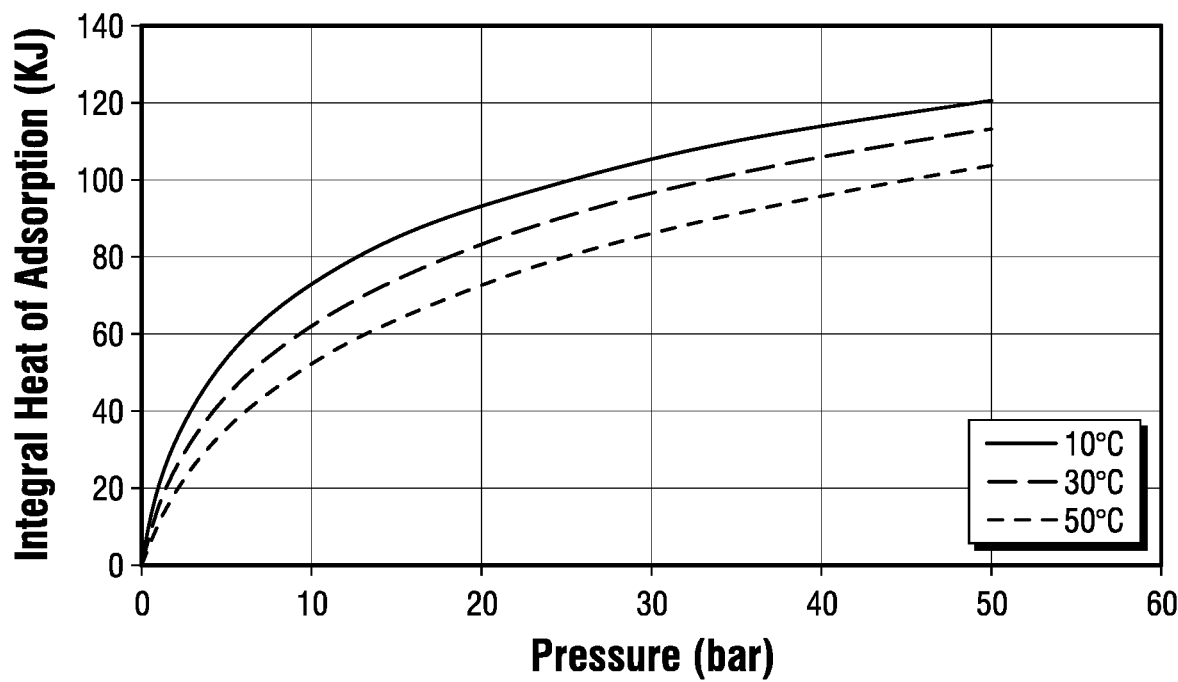
FIG. 13 is a graph showing integral heat of adsorption released for a methane adsorption process at three different temperatures for varying pressures.

Equation 3 can be numerically integrated to obtain the integral heat of adsorption, which is the total amount of heat of adsorption released during the adsorption process. Assuming a constant bed temperature, the integral heat of adsorption heat released is calculated for an adsorber packed with 1 kg of activated carbon SRD08017 at a temperature range of 10-60° C. and a pressure range of 0-50 bars. Although FIG. 12 shows that isosteric heat is slightly greater at greater adsorption temperatures, FIG. 13 shows the integral heat of adsorption released at greater temperatures is less than that at lower temperature. This is due in part to a lesser amount of methane being adsorbed at higher temperature.

In one example, assuming four adsorber vessels are filled with activated carbon SRD08017, a Toth isotherm model is used to calculate the amount of methane adsorbed at 900 psia pipeline pressure. The adsorber beds are kept at 10° C. during the charging process, and the flow rate of charging is 3 MMSCFD. Table 6 shows the activated carbon SRD08017 weight, stored amount of gas at the pressure of 900 psia, and total adsorption heat which needs to be removed to keep the bed temperature at 10° C.

TABLE 6

Design parameters calculated for an example mobile gas adsorption storage and transport facility.

| | |
|---|---|
| Activated carbon SRD08017 weight (kg) | 37,374 |
| Methane Adsorbed (MMSCF) | 0.25 |
| Methane Stored (MMSCF) | 0.38 |
| Adsorption Heat (MMBTU) | 4.49 |
| Charge time (hours) | 3.06 |
| Cooling Duty (MMBTU/hour) | 1.47 |

In certain other embodiments, activated carbon weight can be between about 26,695 kg and about 38,136 kg, methane adsorbed can be between about 0.18 MMSCF and about 0.26 MMSCF, methane stored can be between about 0.27 MMSCF and about 0.39 MMSCF, adsorption heat can be between about 3.2 MMBTU and about 4.6 MMBTU, the charge time can be between about 2.18 hours and about 3.12 hours, and the cooling duty can be between about 1.1 MMBTU/hour to about 1.5 MMBTU/hour.

In an example showing discharge of methane from a mobile natural gas adsorption storage and transport facility, Table 7 provides an example pipeline natural gas composition. This gas composition is used in the simulation of a compressor and a gas cooler in a discharging process. The final, charged pressure of the main adsorbers is 1 atm and the temperature is 40° C. At this pressure and temperature, the amount of natural gas charged into the adsorber vessels is 0.38 MMSCF, and after discharging the remaining gas volume in the adsorbers is 0.024 MMSCF. About 93.6% of the stored gas can be discharged, and the 6% remaining inside the adsorber vessels is considered baseload. An example discharging time can be assumed to be about 6 hours (a typical summer peak demand time between 10:00 and 16:00 hours), and in this case the discharging flow rate is 0.059 MMSCF/hour.

TABLE 7

Example composition of pipeline natural gas.

| Components | Mole Fraction |
|---|---|
| Nitrogen | 0.07 |
| CO2 | 0.0036 |
| Methane | 0.8868 |
| Ethane | 0.0323 |
| Propane | 0.0049 |
| Iso-Butane | 0.0006 |
| n-Butane | 0.001 |
| Iso-Pentane | 0.0003 |
| n-Pentane | 0.0002 |
| n-Hexane | 0.0002 |
| n-Heptane | 0.0001 |
| n-Octane | 0.0001 |

Figure 14:
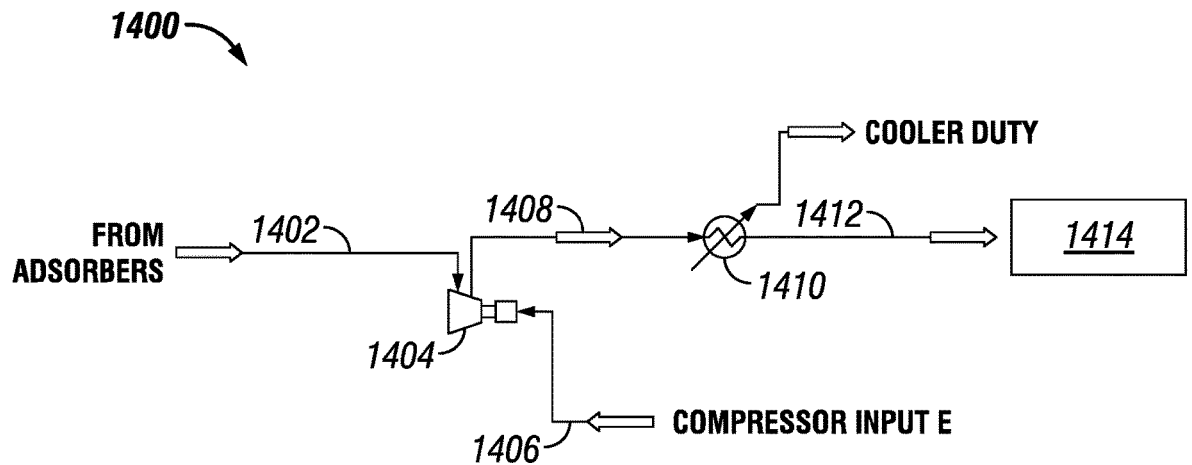
FIG. 14 is a process flow diagram for a simulation run for natural gas compressing and cooling during a discharging process.

Aspen HYSYS 9.0 was used to simulate a compressing and cooling process, and FIG. 14 shows the modeled process flow diagram for simulating compressing and cooling in the discharging process. In system 1400, discharging natural gas from one or more adsorption beds proceeds through line 1402 to a compressor 1404. Compressor 1404 is controlled by either or both of wired or wireless inputs 1406. Wired or wireless inputs 1406 control the compressor to discharge natural gas from a mobile natural gas adsorption storage and transport facility at a suitable pressure for a power generator 1414. After passing through compressor 1404, discharged natural gas passes through line 1408 to a gas cooler 1410 for cooling. After gas cooler 1410, the discharged natural gas travels via line 1412 to a power generator 1414. In the example shown, discharged natural gas is discharged at 1 atm pressure and 104° F. and compressed to 400 psia via compressor 1404 (this is the typical inlet pressure for certain natural gas power plants, and it can also assumed to be the inlet pressure for individual natural gas power generators).

The materials and energy streams of the simulation ran are shown in Table 8.

Assuming a discharged amount of gas is 0.3556 MMSCF, the charging time is about 3 hours and discharging time is about 6 hours. Considering energy consumption of cooling during charging shown in Table 6 (over 3 hours) along with energy consumption of compressing and cooling during discharge in Table 8 (over 6 hours), total energy cost is about 17.7 MMBTU. Advantageously, while 0.3556 MMSCF can provide 355.6 MMBTU (assuming gas heating value is 1,000 BTU/SCF), the net available energy for power generation is about 337.9 MMBTU, and the energy efficiency for the discharged gas is about 93% for power generation.

Figure 15:
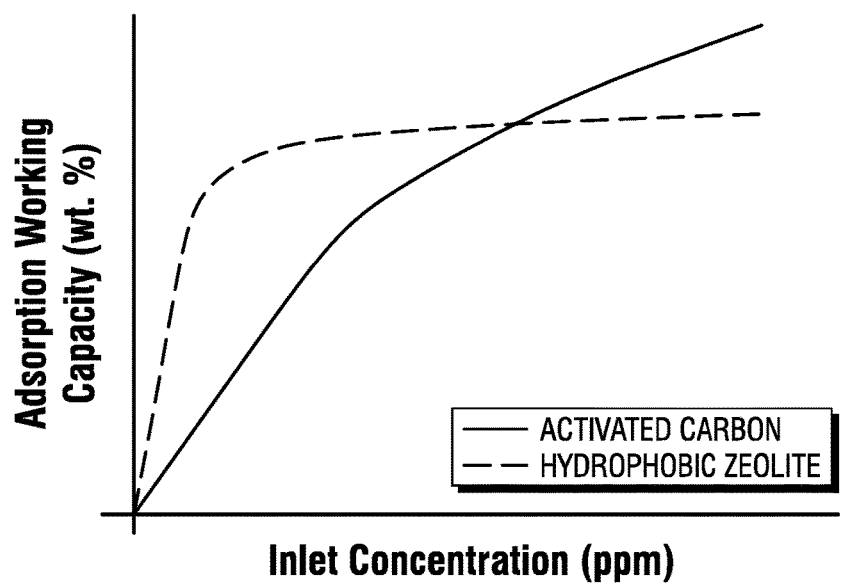
FIG. 15 is a graph showing adsorption isotherms for activated carbon and hydrophobic zeolite.

In an example, silica zeolites were chosen as adsorbents for modelling the transportation facility. Activated carbons used to store natural gas are hydrophobic, so moisture in natural gas has a minimal effect on adsorption capacity for natural gas. Similarly, zeolite adsorbents with hydrophobicity can be used for adsorptive storage of natural gas by adsorption. At lesser pressures, hydrophobic zeolites have certain advantages over activated carbon for adsorption of organic molecules, such as those used in the volatile organic compounds represented in FIG. 15.

Although zeolite adsorption capacity can be lower than activated carbon, zeolites can be formed in a way and used internally for edges of a guard bed in addition to or alternative to an adsorber to prevent solid particles in natural gas from going into adsorption bed activated carbon or guard bed activated carbon during natural gas charging. Zeolite can also be used to prevent activated carbon fines from going out of the adsorption bed or guard bed during natural gas discharge. For this purpose, zeolite types MFI and CHA were selected for testing. The respective adsorption capacities were calculated using the Grand Canonical Monte Carlo (GCMC) simulation. For the interactions of the zeolite atoms and the methane molecules, the Consistent Valence Forcefield (CVFF) was employed.

Zeolites can be used in shapes such as beads or pellets. In this context, either MFI or CHA, or other suitable zeolites and combinations of zeolites, can be used in bead or pellet form, so that they can prevent the fines of activated carbon exiting a guard bed or adsorber during discharge and also prevent particles in a natural gas stream from going inside an activated carbon guard bed or adsorber during charging.

Both MFI and CHA are structure codes for zeolite. In some embodiments, hydrophobic MFI or CHA are used to avoid adsorbing moisture from natural gas. In some embodi-

TABLE 8

Compressing and cooling simulation during a discharging process from a mobile natural gas adsorption storage and transport unit.

| | Materials Streams | | |
|---|---|---|---|
| Property | From Adsorbers, 1402 | To Cooler, 1408 | To Power Generator, 1412 |
| Vapor Fraction | 1.00 | 1.00 | 1.00 |
| Temperature [° F.] | 104 | 740 | 104 |
| Pressure [psia] | 14.7 | 400 | 400 |
| Molar Flow [MMSCFD] | 1.4232 | 1.4232 | 1.4232 |
| Heat Flow [Btu/hr] | −4.76E+06 | −3.67E+06 | −4.79E+06 |

| | Energy Streams | |
|---|---|---|
| Property | Compressor Duty | Cooler Duty |
| Heat Flow [MM Btu/hr] | 1.10 | 1.12 | ments, there is no aluminum in the framework structure, and it is a pure silica zeolite. Therefore, it is hydrophobic and can preferably adsorb hydrocarbons in the presence of water moisture.

Figure 16:
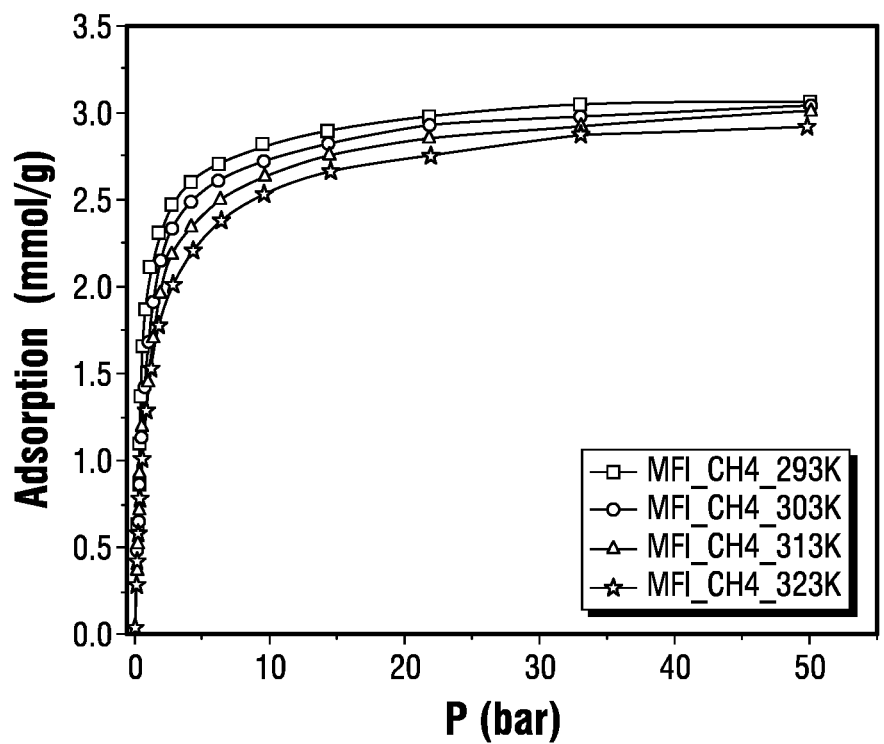
FIG. 16 is a graph showing adsorption isotherms of $CH_4$ on MFI all silica zeolite at 293 K, 303 K, 313 K, and 323 K obtained from a Grand Canonical Monte Carlo simulation technique.
Figure 17:
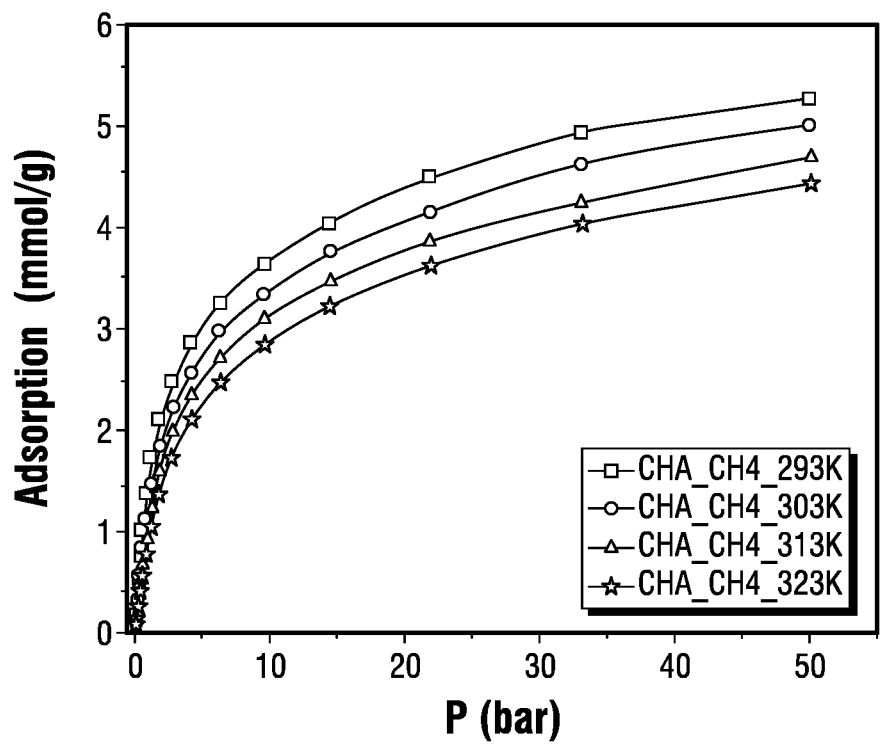
FIG. 17 is a graph showing adsorption isotherms of $CH_4$ on CHA all silica zeolite at 293 K, 303 K, 313 K, and 323 K obtained from Grand Canonical Monte Carlo simulation technique.

For the GCMC simulation where the whole system of solid and gas is concerned, $6 \times 10^3$ Monte Carlo steps for the system to reach equilibrium were performed in order to obtain statistical averages. The adsorption capacity (mmol/g) of the adsorbed gas molecules on the two systems at each thermodynamic point was calculated and the results obtained are presented in FIGS. 16 and 17. As shown in FIGS. 16 and 17, CHA zeolite has a higher adsorption capacity than the MFI zeolite. All-silica zeolite structures can be used for methane adsorption for mobile storage and transportation applications, such as a natural gas adsorption mobile storage and transportation unit.

At lower concentration of $C_{2+}$ (less than about 20 mol. %), selectivity of a guard bed may be less because of lesser partial pressure of the $C_{2+}$ components. In certain embodiments of systems and methods, a separate guard bed is not required at highly methane dominant natural gas compositions, for example greater than about 85 mol. % methane, greater than about 90 mol. % methane, or greater than about 95 mol. % methane. Embodiments disclosed here also allow for reduced liquid hydrocarbon used in power generation, for example diesel. Natural gas is also a clean burning gas, and embodiments of the disclosure allow for reduced $CO_2$ and particulate matter emissions.

The term "about" when used with respect to a value or range refers to values including plus and minus 5% of the given value or range.

The singular forms "a," "an," and "the" include plural referents, unless the context clearly dictates otherwise.

In the drawings and specification, there have been disclosed embodiments of systems and methods for adsorption based natural gas storage and transport at reduced pressures compared to compressed liquid natural gas transport, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for natural gas storage and transport with a mobile unit, the method comprising the steps of:
    charging a mobile natural gas storage and transport unit with natural gas via adsorption of the natural gas on adsorbent materials disposed within the mobile natural gas storage and transport unit;
    transporting the mobile natural gas storage and transport unit a distance to proximate a natural gas power generation unit; and
    discharging the natural gas over time via desorption of the natural gas from the adsorbent materials to power the natural gas power generation unit.

2. The method according to claim 1, where the step of charging lasts for between about 1 hour and about 5 hours.

3. The method according to claim 1, where the step of charging lasts for about 3 hours.

4. The method according to claim 1, where the adsorbent materials comprise microporous adsorbent materials.

5. The method according to claim 4, where the microporous adsorbent materials comprise at least one of activated carbon or silica zeolites.

6. The method according to claim 1, where the step of transporting does not consume natural gas adsorbed to the adsorbent materials.

7. The method according to claim 1, where the step of transporting includes at least one mode of transportation selected from the group consisting of: a truck, a train, a ship, and a plane.

8. The method according to claim 1, where the step of discharging lasts for between about 5 hours and about 10 hours.

9. The method according to claim 1, where the step of discharging lasts for about 6 hours.

10. The method according claim 1, where the step of charging includes separating components of the natural gas by adsorption of components with a greater molecular weight than methane in a guard bed separate from the adsorbent materials.

11. The method according to claim 1, where the step of charging includes the step of cooling a portion of the natural gas storage and transport unit.

12. The method according to claim 1, where the step of discharging includes the step of compressing at least a portion of discharged natural gas.

13. The method according to claim 12, where the portion of natural gas is compressed to between about 300 pounds per square inch absolute (psia) and about 500 psia.

14. The method according to claim 1, where the step of discharging includes the step of cooling at least a portion of discharged natural gas.

15. The method according to claim 1, where the step of charging occurs with the adsorbent materials at between about 10° C. to about 30° C.

16. The method according to claim 1, where a majority of the adsorbent materials have pore diameters of between about 10 Å to about 50 Å.

17. The method according to claim 1, where the step of charging includes charging at least one guard bed comprising microporous materials with pore sizes between about 25 Å and about 50 Å, and charging at least one adsorbent bed with the adsorbent materials, where a majority of the adsorbent materials have pore diameters of between about 10 Å to about 20 Å.

18. The method according to claim 1, where the step of discharging the natural gas over time occurs at least in part due to pressure built up in the mobile natural gas storage and transport unit from the step of charging.

19. The method according to claim 1, where the step of charging charges between about 0.1 to about 0.5 million standard cubic feet (MMSCF) of natural gas to the adsorbent materials.

20. The method according to claim 1, where at least about 90% of the natural gas charged during the step of charging is discharged during the discharging step and used to generate power in the natural gas power generation unit.

21. The method according to claim 1, where the step of discharging occurs during and throughout a period of peak demand for electricity.

22. The method according to claim 1, where the step of charging results in adsorbed natural gas at about 1 atm pressure and about 100° F. temperature.

23. A system for natural gas storage and transport with a mobile unit, the system comprising:
    a guard bed, the guard bed comprising guard bed adsorbent materials operable to adsorb natural gas components with a molecular weight greater than methane, the guard bed operable to fluidly connect to a natural gas charging station to charge the system with natural gas;

an adsorber bed, the adsorber bed comprising adsorber bed adsorbent materials operable to adsorb methane from natural gas, where the adsorber bed is fluidly coupled to the guard bed; and a mobile platform operable to hold the guard bed and adsorber bed during transport from the natural gas charging station to a discharging station, where the system is operable to discharge the natural gas over time at the discharging station via desorption of the natural gas from the adsorbent materials.

24. The system according to claim 23, where the system includes two adsorber beds and where the system charges with natural gas from a natural gas sales pipeline in between about 1 hour and about 5 hours.

25. The system according to claim 24, where the system charges with natural gas from a natural gas sales pipeline in about 3 hours.

26. The system according to claim 23, where the adsorbent materials comprise microporous adsorbent materials.

27. The system according to claim 26, where the microporous adsorbent materials comprise at least one of activated carbon or silica zeolites.

28. The system according to claim 23, where the system does not consume natural gas adsorbed to the adsorbent materials during transport for fuel for the system.

29. The system according to claim 23, where the mobile platform is suitable for transport with at least one mode of transportation selected from the group consisting of: a truck, a train, a ship, and a plane.

30. The system according to claim 23, where the system discharging at the discharging station lasts for between about 5 hours and about 10 hours.

31. The system according to claim 30, where the system discharging at the discharging station lasts for about 6 hours.

32. The system according to claim 23, where the system further comprises a cooling unit to cool the natural gas.

33. The system according to claim 23, where the system further comprises a compressor, where the compressor is operable to compress a portion of natural gas to between about 300 pounds per square inch absolute (psia) and about 500 psia proximate the discharging station.

34. The system according to claim 23, where the system is charged with natural gas at between about 10° C. to about 30° C.

35. The system according to claim 23, where a majority of the adsorbent materials have pore diameters of between about 10 Å to about 50 Å.

36. The system according to claim 23, where the guard bed adsorbent materials comprise microporous materials having pore sizes between about 25 Å and about 50 Å, and where the adsorber bed adsorbent materials comprise adsorbent materials where a majority of the adsorbent materials have pore diameters of between about 10 Å to about 20 Å.

37. The system according to claim 23, where the system is operable to discharge the natural gas over time at least in part due to pressure built up in the system from charging.

38. The system according to claim 23, where the system is operable to hold for transport between about 0.1 to about 0.5 million standard cubic feet (MMSCF) of natural gas in the adsorbent materials.

39. The system according to claim 23, where at least about 90% of the natural gas charged to the system is discharged from desorption to the discharging station.

40. The system according to claim 23, where the system when charged results in adsorbed natural gas at about 1 atm pressure and about 100° F. temperature.

41. The system according to claim 27, where the microporous adsorbent materials comprise activated carbon and silica zeolites, the silica zeolites positioned to protect the activated carbon from dislodgment and moisture in natural gas.

* * * * *